(12) United States Patent
Pritikin

(10) Patent No.: US 7,451,305 B1
(45) Date of Patent: Nov. 11, 2008

(54) METHOD AND APPARATUS FOR SECURELY EXCHANGING CRYPTOGRAPHIC IDENTITIES THROUGH A MUTUALLY TRUSTED INTERMEDIARY

(75) Inventor: Max Pritikin, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 746 days.

(21) Appl. No.: 10/411,964

(22) Filed: Apr. 10, 2003

(51) Int. Cl.
*H04L 9/00* (2006.01)

(52) U.S. Cl. .......................................... 713/153; 726/12
(58) Field of Classification Search ................. 713/150, 713/153; 726/4, 150, 12
See application file for complete search history.

(56) References Cited

U.S. PATENT DOCUMENTS

| | | | |
|---|---|---|---|
| 5,268,962 A | | 12/1993 | Abadi et al. |
| 5,668,878 A | * | 9/1997 | Brands ........................ 380/30 |
| 5,850,517 A | * | 12/1998 | Verkler et al. ............... 709/202 |
| 5,961,601 A | | 10/1999 | Iyengar |
| 5,963,915 A | * | 10/1999 | Kirsch ......................... 705/26 |
| 6,134,592 A | | 10/2000 | Montulli |
| 6,253,326 B1 | | 6/2001 | Lincke et al. |
| 6,263,437 B1 | * | 7/2001 | Liao et al. ................... 713/169 |
| 6,496,932 B1 | | 12/2002 | Trieger |
| 6,904,521 B1 | * | 6/2005 | Jivsov ......................... 73/155 |
| 6,938,171 B1 | * | 8/2005 | Isomichi et al. ............... 726/12 |
| 2004/0015725 A1 | * | 1/2004 | Boneh et al. ................. 713/201 |
| 2004/0030925 A1 | * | 2/2004 | Raheman .................... 713/201 |
| 2005/0154873 A1 | | 7/2005 | Cam-Winger et al. |

OTHER PUBLICATIONS

T. Dierks, C. Allen. "The TLS Protocol Version 1.0." RFC 2246. Jan. 1999. http://rfc.sunsite.dk/rfc/rfc2246/html. Accessed on Jul. 20, 2006. .pp. 1, 4, 29-32, 68-69.*
Thomas Wason, et al., "Liberty ID-FF Architecture Overview, Version 1.2," Liberty Alliance Project, www.project-liberty.org/, pp. 1-44.
T. Berners-Lee, et al., "Hypertext Markup Language—2.0," Nov. 1995, Network Working Group, Request for Comments: 1866, http://www.ietf.org/rfc/rfc1866.txt?number=1866, printed Jul. 10, 2003, pp. 1-72.
R. Fielding, et al., "Hypertext Transfer Protocol—HTTP/1.1," Jan. 1997, Network Working Group, Request for Comments: 2068, http://www.ietf.org/rfc/rfc2068.txt?number=2068, printed Jul. 10, 2003, pp. 1-152.
J. Jonsson, et al., "Public-Key Cryptography Standards (PKCS) #1: RSA Cryptography Specifications Version 2.1," Feb. 2003, Network Working Group, Request for Comments: 3347, http://www.ietf.org/rfc/rfc3447.txt?number=3447, printed Jul. 10, 2003, pp. 1-68.

(Continued)

*Primary Examiner*—Kambiz Zand
*Assistant Examiner*—Jason K Gee
(74) *Attorney, Agent, or Firm*—Hickman Palermo Truong & Becker LLP

(57) ABSTRACT

A method of securely exchanging cryptographic identities through a mutually trusted intermediary is disclosed. Data, which specifies a petitioner's cryptographic identity and a petitioner's resource identifier, is received. Input, which specifies an authority's resource identifier, is received. The petitioner's cryptographic identity and the petitioner's resource identifier are sent to a destination that is associated with the authority's resource identifier. Data, which specifies the authority's cryptographic identity, is received. The authority's cryptographic identity is sent to a destination that is associated with the petitioner's resource identifier.

19 Claims, 6 Drawing Sheets

OTHER PUBLICATIONS

B. Kaliski, et al., "PKCS #1: RSA Cryptography Specifications Version 2.0," Oct. 1998, Networking Working Group, Request for Comments: 2437, http://www.ietf.org/rfc/rfc2437.txt?number=2437, printed Jul. 10, 2003, pp. 1-37.

B. Kaliski, "PKCS #1, RSA Encryption Version 1.5," Mar. 1998, Network Working Group, Request for Comments: 2313, http://www.ietf.org/rfc/rfc2313.txt?number=2313, printed Jul. 10, 2003, pp. 1-18.

International Searching Authority, "Notification of Transmittal of the International Search Report and the Written Opinion of the International Searching Authority, or the Declaration," PCT/US05/00812 (50325-1010), dated Jun. 14, 2006, 6 pages.

Claims, PCT/US05/00812 (50325-1010), 10 pages.

Baker, F. et al., "RSVP Cryptographic Authentication,"Network Working Group, RFC 2747, Jan. 2000, 20 pages.

Braden, R., et al., "Resource ReSerVation Protocol (RSVP)," Network Working Group, RFC 2205, Sep. 1997, 105 pages.

Herzog, S. et al., "RSVP Extension for Policy Control," Network Working Group, RFC 2750, Jan. 2000, 13 pages.

Birk, Yithak, "Coding On Demand by an Informed Source (ISCOD) for Efficient Broadcast of Different Supplemental Data to Caching Clients," IEEE Transactions on Information Theory, vol. 52, No. 6, Jun. 2006, pp. 2825-2830.

Phatak, S.H., et al., "Web&: An Architecture for Non-Interactive Web," Internet Applications, 2001, WIAPP 2001, Proceedings of the Second IEEEE Workshop on Jul. 23-24, 2001, pp. 104-112.

Yao, Bin et al., "Proxy-based Recovery for Applications on Wireless Hand-held Devices," Reliable Distributed Systems 2000, SRDS-2000, Proceedings of the 19$^{th}$ IEEE Symposium on Oct. 16-18, 2000. pp. 2-10.

International Searching Authority "Notification of Transmittal of The International Search Report and The Written Opinion of the International Searching Authority, or the Declaration", PCT/US06/11479, dated May 1, 2007, 8 pages.

\* cited by examiner

METHOD AND APPARATUS FOR SECURELY EXCHANGING CRYPTOGRAPHIC IDENTITIES THROUGH A MUTUALLY TRUSTED INTERMEDIARY

FIELD OF THE INVENTION

The present invention generally relates to computer security. The invention relates more specifically to a method and apparatus for securely exchanging cryptographic identities through a mutually trusted intermediary.

BACKGROUND OF THE INVENTION

The approaches described in this section could be pursued, but are not necessarily approaches that previously have been conceived or pursued. Therefore, unless otherwise indicated herein, the approaches described in this section are not prior art to the claims in this application and are not admitted to be prior art by inclusion in this section.

When communicating confidential or sensitive information between two devices, such as two computers connected to a network, such information may be encrypted prior to transmission through an insecure carrier so that only those who possess the means to decrypt the encrypted information will be able to understand or use the information.

To this end, Whitfield Diffie and Martin Hellman invented public key cryptography in 1976. Using public key cryptography, an information sender uses an information recipient's public key to encrypt information. The information recipient uses the information recipient's private key to decrypt the encrypted information. A particular private key can only decrypt information that has been encrypted with a corresponding public key. Determining the private key, based on the public key and the encrypted information, is impractical with typical computing resources. The information sender can only use the information recipient's public key to encrypt a message that is to be decrypted by the information recipient. Thus, the information recipient's public key may be viewed as a "cryptographic identity" of the information recipient.

Thus, for two devices to communicate information securely between each other, the two devices initially exchange cryptographic identities. For example, a user of a first device (the "first user") may call a user of a second device (the "second user") using the telephone. The first user may speak the first user's cryptographic identity to the second user. If the second user recognizes the first user's voice, or is otherwise able to verify that the cryptographic identity actually did originate from the first user, then the second user is assured that only the first user will be able to decrypt information that the second user encrypts with the cryptographic identity. Without such verification, the second user might unknowingly encrypt messages with a cryptographic identity that purports to be, but is not actually, the cryptographic identity of the first user. Therefore, secure communication depends on such verification.

In this age of electronic commerce, a user might want to introduce two parties so that the two parties can exchange information relating to the user directly and securely. For example, if a bank's device stores the user's bank account, and if a bookstore's device stores the user's purchase orders, then the user might want to introduce the bank and the bookstore so that the bookstore's device can automatically charge the user's bank account without the user's intervention whenever the user submits a purchase order to the bookstore's device. To ensure that such information will not be intercepted by those for whom it was unintended, the user might want to provide the cryptographic identity of the each party to the other party's device.

Typically, each of the two parties will have some way of verifying the user. For example, the two parties' devices may store passwords that only the user can supply. However, if the two parties are being introduced, then the two parties' devices have no established way of verifying each other. While a trust relationship exists between the user and each of the two parties separately, no trust relationship exists between the two parties directly.

Cryptographic identities, such as public keys and symmetric keys, can be long, complex, and difficult to communicate manually or vocally. As a result, a user may make mistakes when trying to communicate the cryptographic identity of one party to another party's device. Furthermore, many less sophisticated users know little or nothing about cryptography or the significance, meaning, or use of a cryptographic identity. For such users, establishing a secure association between two other parties can be a mysterious, complicated, and bewildering task.

Based on the foregoing, there is a clear need for a method of securely exchanging cryptographic identities through a mutually trusted intermediary without requiring a user to manually or vocally communicate the cryptographic identities.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
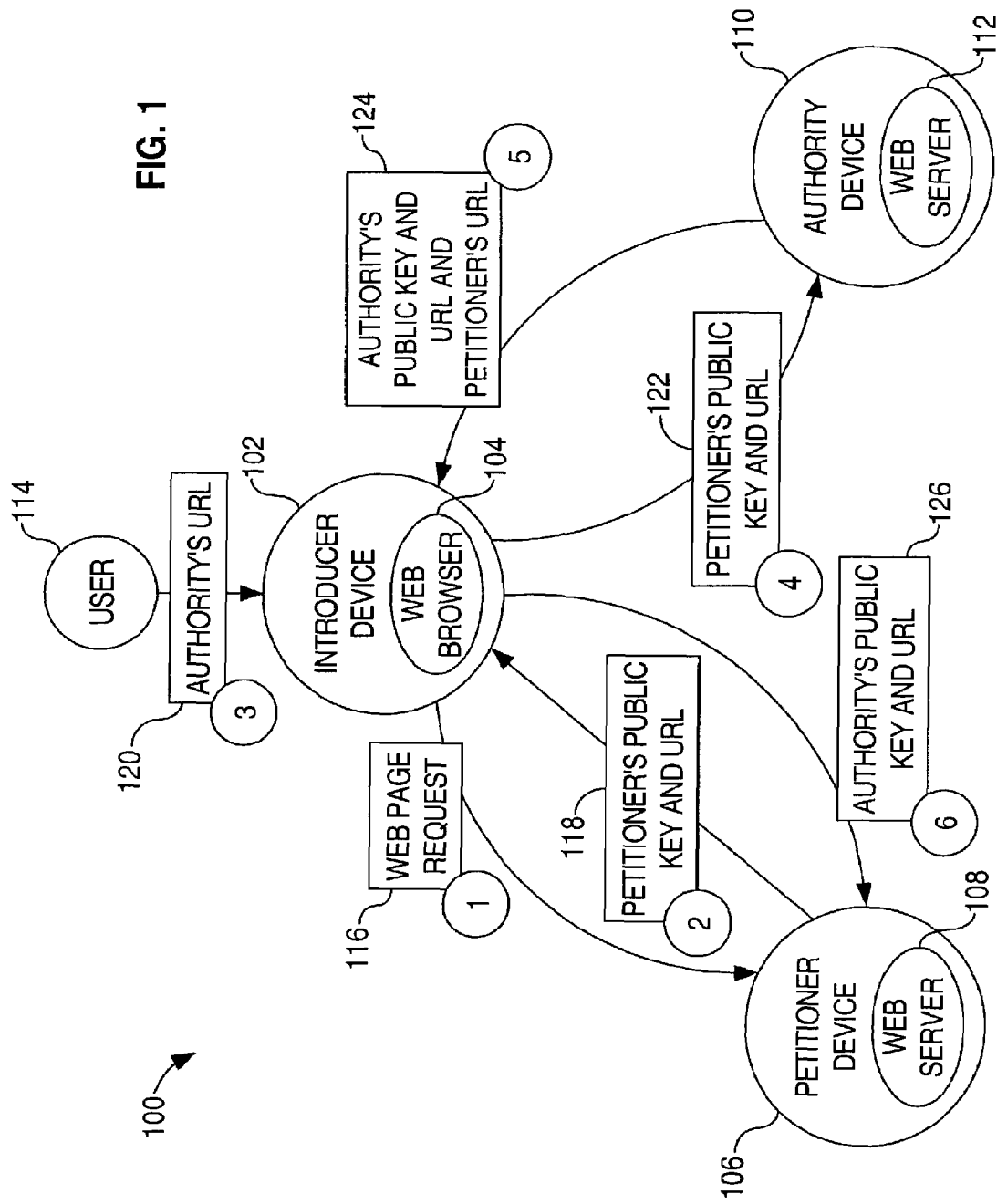
FIG. 1 is a block diagram that illustrates an overview of an example system that may be used to practice a method of securely exchanging cryptographic identities through a mutually trusted intermediary.

A method and apparatus for securely exchanging cryptographic identities through a mutually trusted intermediary is described. In the following description, for the purposes of explanation, numerous specific details are set forth in order to provide a thorough understanding of the present invention. It will be apparent, however, to one skilled in the art, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Securely Exchanging Cryptographic Identities Through a Mutually Trusted Intermediary
4.0 Implementation Mechanisms—Hardware Overview
5.0 Extensions and Alternatives

1.0 GENERAL OVERVIEW

The needs identified in the foregoing Background, and other needs and objects that will become apparent from the following description, are achieved in the present invention, which comprises, in one aspect, a method of securely exchanging cryptographic identities through a mutually trusted intermediary. Data, which specifies a petitioner's cryptographic identity and a petitioner's resource identifier, is received. Input that specifies an authority's resource identifier is received. Such input may be received, for example, from a user or a device or an automated system. The petitioner's cryptographic identify and the petitioner's resource identifier are sent to a destination that is associated with the authority's resource identifier. Data, which specifies the authority's cryptographic identity, is received. The authority's cryptographic identity is sent to a destination that is associated with the petitioner's resource identifier.

For example, the petitioner may be a bank and the authority may be a bookstore. A user can direct a web browser to request the bank's web page by entering the bank's Uniform Resource Locator (URL) into the web browser's address field. In response to receiving a request from the web browser, the bank's web server may respond with a web page that specifies a script and a form that contains the bank's public key, the bank's URL, and an input field. The form may carry the bank public key and the bank URL in Hypertext Markup Language (HTML) hidden fields so that the bank public key and bank URL are not displayed to the user. The web browser may receive the web page and display the web page, including the input field, to the user. The user may enter the bookstore's URL into the input field. The script may cause the information contained in the form, including the bank's public key, to be submitted to the bookstore's URL, as entered in the input field, instead of the bank's URL.

In response to receiving the information contained in the form, the bookstore's web server may respond with a web page that specifies a form that contains the bookstore's public key. The form may carry the public key in a hidden field. The web page may specify that the form, when submitted, should be submitted to the bank's URL. The web browser may receive the web page and display the web page to the user. The web server may submit the information contained in the form, including the bookstore's public key, to the bank's URL.

Thus, each of the parties may receive the other's cryptographic identity automatically. Each of the parties receiving a cryptographic identity may verify the user according to an established authentication mechanism. For example, each party may request a password known only to the party and user. By verifying the user, the parties obtain assurance that the cryptographic identity received actually is the cryptographic identity presented by the introducer of the other party. The user's web browser functions as a mutually trusted intermediary. The public keys are transferred without either party having to speak or type the keys.

Because the user does not need to know or supply the cryptographic identities of either party, both the user's involvement in the exchange and the knowledge required of the user are minimized. The user's knowledge of each of the parties' resource identifiers is sufficient to facilitate the exchange. As a result, cryptographic identities may be securely exchanged through a mutually trusted intermediary without requiring the user to manually or vocally communicate the cryptographic identities. When hidden fields are used, the users need not even know that a key exchange is occurring.

In other aspects, the invention encompasses a computer apparatus and a computer-readable medium configured to carry out the foregoing steps.

2.0 STRUCTURAL AND FUNCTIONAL OVERVIEW

FIG. 1 is a block diagram that illustrates an overview of an example system that may be used to practice a method of securely exchanging cryptographic identities through a mutually trusted intermediary. A system 100 comprises an introducer device ("introducer") 102, a petitioner device ("petitioner") 106, and an authority device ("authority") 110. Introducer 102 is so called because the introducer introduces the petitioner to the authority. Petitioner 106 is so called because, in one embodiment, the petitioner may be viewed as petitioning for access to an authentication infrastructure. Authority 110 is so called because, in one embodiment, the authority belongs to an authentication infrastructure and may be viewed as using the authorization levels of introducer 102 to allow petitioner 106 to join the authentication infrastructure. For example, devices 102, 106, and 110 may be computers, processes, applications, agents, etc.

Introducer 102 is coupled communicatively with petitioner 106 and authority 110. For example, introducer 102 may be connected to a computer network, to which petitioner 106 and authority 110 are also connected. The network may be a local area network (LAN), a wide area network (WAN), one or more inter-networks, etc. Petitioner 106 and authority 110 may also be coupled communicatively with each other. User 114 may interact with introducer 102 through a user interface that may comprise both user input devices, such as a keyboard and mouse, and user output devices, such as a monitor and speakers. The system shown is just one of many possible different configurations. Other embodiments may include fewer or more system components than those illustrated.

Introducer 102 comprises a web browser 104. For example, web browser 104 may be an instance of a computer application such as Microsoft Internet Explorer or Netscape Navigator. Petitioner 106 comprises web server 108. Authority 110 comprises web server 112. Web server 108 and web server 112 may be instances of a computer application such as Apache HTTP Server. Together, web browser 104 and web server 106 comprise a communication interface between introducer 102 and petitioner 106. Similarly, web browser 105 and web server 112 comprise a communication interface between introducer 102 and authority 110. While the illustrated communication interfaces comprise a web browser and web server, the communication interfaces may comprise other communicating processes, such as an HTML-enabled e-mail client application and an e-mail server.

Through these communication interfaces, introducer 102 may exchange information with petitioner 106 and authority 110. According to one embodiment, introducer 102 is authenticated with each of petitioner 106 and authority 110 prior to any data being exchanged between introducer 102, petitioner 106, and authority 110. The order of an example of one such exchange of information is denoted in FIG. 1 by circumscribed numerals 1 through 5. The order presented below is just one example; the communications between introducer 102, petitioner 106, and authority 110 may occur in a different order than the one described below.

At circumscribed numeral 1, introducer 102 sends data 116 to petitioner 106. Data 116 comprises a web page request. Petitioner 106 receives data 116. For example, by entering a URL that is associated with petitioner 106, user 114 may direct web browser 104 to send the web page request to the petitioner. Web server 108 may receive the web page request.

At circumscribed numeral 2, in response to receiving data 116, petitioner 106 sends data 118 to introducer 102. Data 118 comprises the public key and URL of petitioner 106. Introducer 102 receives data 118. Continuing the example, web server 108 may respond to the web page request by sending a web page that is stored on petitioner 106; the web page comprises data 118. The web page may specify a form that contains an input field and the public key and URL of petitioner 106. The web page may specify text that instructs a user to enter a URL of an authority with which petitioner 106 should exchange public keys. The web page may specify a script that, when executed, will change a submission destination that is specified in the form to the value of the input field. Web browser 104 may receive the web page. Web browser 104 may display the web page, including the input field and text, to user 114. The public key and URL of petitioner 106 may be hidden from the user, as in HTML hidden input fields or other mechanisms.

At circumscribed numeral 3, introducer 102 receives data 120 from user 114. Data 120 comprises the URL of authority 110. Continuing the example, user 114, following instructions displayed in the web page, may enter the URL of authority 110 into the input field.

At circumscribed numeral 4, introducer 102 sends data 122 to authority 110. Data 122 comprises the public key and URL of petitioner 106 as specified in data 118. Authority 110 receives data 122. Continuing the example, web browser 104 may execute the script that is specified in the web page. Performing according to the script, web browser 104 may change the form's submission destination to match the value of the input field, which contains the URL of authority 110. In response to the submission of the form, web browser 104 may send the form's contents, including the public key and URL of petitioner 106 as specified in data 118, to authority 110. Web server 112 may receive the public key and URL of petitioner 106. Web server 112 may request authentication, such as a username and password, from web browser 104. If the username and password received from web browser 104 do not correspond to a username-password association stored on authority 110, then authority 110 may refuse to proceed with the exchange as described below.

In response to receiving data 122, at circumscribed numeral 5, authority 110 sends data 124 to introducer 102. Data 124 comprises the public key and URL of authority 110, and the URL of petitioner 106 as specified in data 122. Introducer 102 receives data 124. Continuing the example, authority 110 may store an association between user 114 and the public key and URL of petitioner 106. In response to receiving the public key and URL of petitioner 106 from introducer 102, web server 112 may send a web page that was generated by authority 110. The web page may specify a form that contains the public key and URL of authority 110. The public key and URL comprise data 124, in this example. The form's submission destination is the URL of petitioner 106 as specified in data 122. Web browser 104 may receive the web page.

Web browser 104 may display the web page to user 114. The public key and URL of authority 110 and the URL of petitioner 106 may be hidden from the user.

At circumscribed numeral 6, introducer 102 sends data 126 to petitioner 108. Data 126 comprises the public key and URL of authority 110 as specified in data 124. Petitioner 106 receives data 126. Continuing the example, in response to the submission of the form, web browser 104 may send the form's contents, including the public key and URL of authority 110 as specified in data 124, to petitioner 106. Web server 108 may receive the public key and URL of authority 110. Web server 108 may request authentication, such as a username and password, from web browser 104. If the username and password received from web browser 104 do not correspond to a username-password association stored on petitioner 106, then petitioner 106 may refuse to complete the exchange as described below.

Petitioner 106 may store an association between user 114 and the public key and URL of authority 110. Thus, when the exchange is completed, petitioner 106 may store an association between user 114 and the URL of authority 110, and authority 110 may store an association between user 114 and the URL of petitioner 106. A trust relationship between petitioner 106 and authority 110 is secured, based transitively on the trust relationships between introducer 102 and each of the petitioner and the authority separately. Thereafter, petitioner 106 and authority 110 may exchange information related to user 114 securely. Due to the automatic nature of the introduction between petitioner 106 and authority 110, user 114 does not need to know or supply the public keys of petitioner 106 or authority 110, making the introduction easy for user 114 to achieve. Further, when hidden HTML input fields are used to transport the public keys and URLs, the user need not even know that a key exchange is occurring.

3.0 METHOD OF SECURELY EXCHANGING CRYPTOGRAPHIC IDENTITIES THROUGH A MUTUALLY TRUSTED INTERMEDIARY

Figure 2:
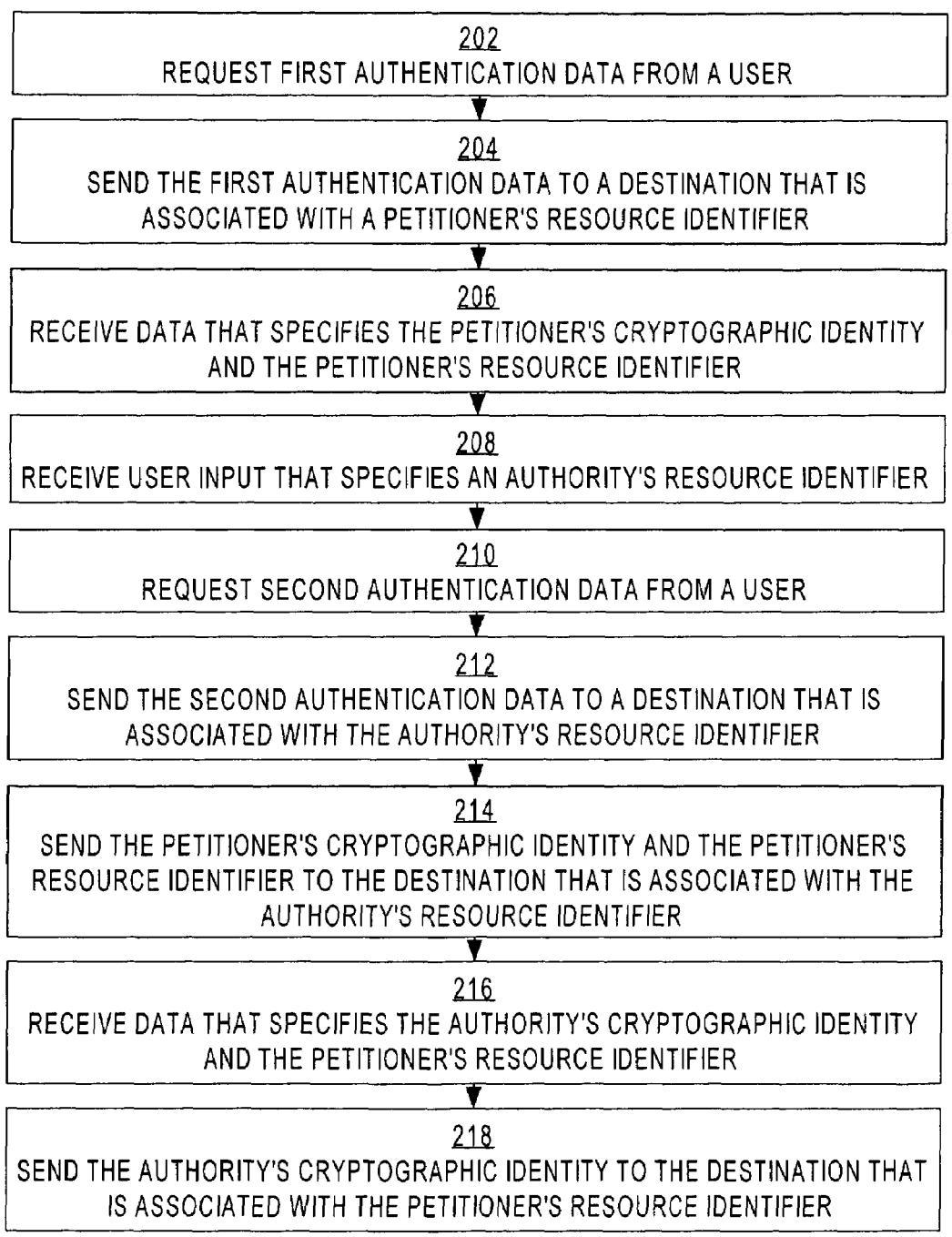
FIG. 2 is a flow diagram that illustrates a high level overview of one embodiment of a method of securely exchanging cryptographic identities through a mutually trusted intermediary.

FIG. 2 is a flow diagram that illustrates a high level overview of one embodiment of a method 200 of securely exchanging cryptographic identities through a mutually trusted intermediary. Such a method may be performed by any of many different devices, such as, for example, introducer 102 described above.

In block 202, first authentication data is requested from a user. For example, in response to a request from petitioner 106, introducer 102 may request a username and password from user 114.

In block 204, the first authentication data is sent to a destination that is associated with a petitioner's resource identifier. For example, in response to receiving a username and password from user 114, introducer 102 may send the username and password to petitioner 106. Thus, trust is established between introducer 102 and petitioner 106.

In block 206, data that specifies the petitioner's cryptographic identity and the petitioner's resource identifier is received. For example, introducer 102 may receive data 118 from petitioner 108, as described above with reference to circumscribed numeral 2 of FIG. 1.

In block 208, user input that specifies an authority's resource identifier is received. For example, introducer 102 may receive data 120 from user 114, as described above with reference to circumscribed numeral 3 of FIG. 1. While, in one embodiment, the input that specifies the authority's resource identifier is received from a user, in an alternative embodiment, the input that specifies the authority's resource identifier is received from a device or an automated system.

In block 210, second authentication data is requested from a user. For example, in response to a request from authority 110, introducer 102 may request a username and password from user 114.

In block 212, the second authentication data is sent to a destination that is associated with the authority's resource identifier. For example, in response to receiving a username and password from user 114, introducer 102 may send the username and password to authority 110. Thus, trust is established between introducer 102 and authority 110.

In block 214, the petitioner's cryptographic identity and the petitioner's resource identifier are sent to the destination that is associated with the authority's resource identifier. For example, introducer 102 may send data 122 to authority 110, as described above with reference to circumscribed numeral 4 of FIG. 1.

In block 216, data that specifies the authority's cryptographic identity and the petitioner's resource identifier is received. The data may also specify the authority's URL. For example, introducer 102 may receive data 124 from authority 110, as described above with reference to circumscribed numeral 5 of FIG. 1.

In block 218, the authority's cryptographic identity is sent to the destination that is associated with the petitioner's resource identifier. The authority's URL may also be sent to the destination. For example, introducer 102 may send data 126 to petitioner 106, as described above with reference to circumscribed numeral 6 of FIG. 1.

As a result of method 200, a petitioner and an authority each obtain the cryptographic identity of the other with an assurance that each cryptographic identity is what it purports to be, without requiring a user to know or provide either cryptographic identity.

Figure 3:
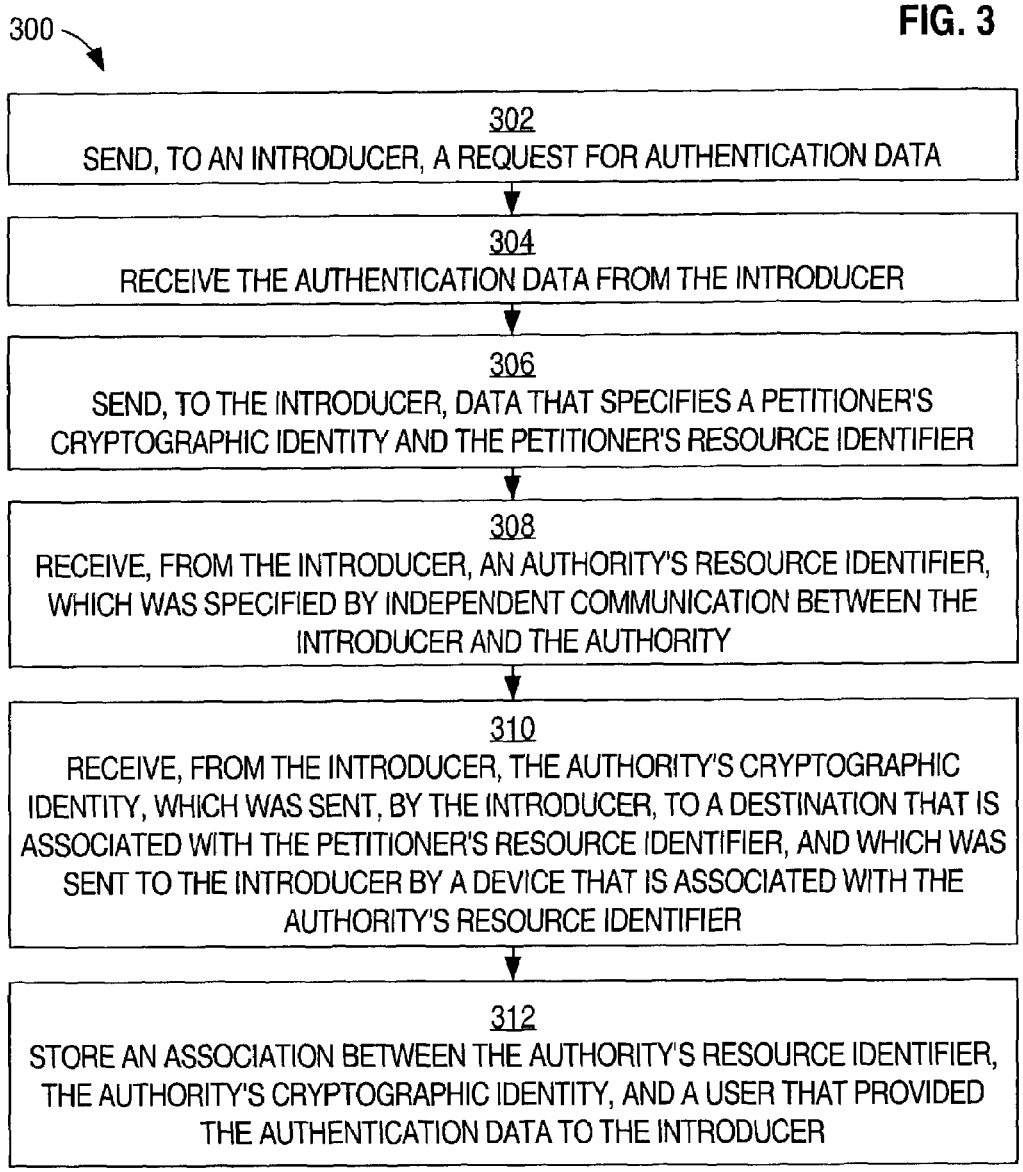
FIG. 3 is a flow diagram that illustrates one embodiment of a method of sending a petitioner's cryptographic identity, and receiving an authority's cryptographic identity, through an introducer.

FIG. 3 is a flow diagram that illustrates one embodiment of a method 300 of sending a petitioner's cryptographic identity, and receiving an authority's cryptographic identity, through an introducer. Such a method may be performed by any of many different devices, such as, for example, petitioner 106 described above.

In block 302, a request for authentication data is sent to an introducer. For example, petitioner 106 may send, to introducer 102, a request for a username and password. In block 304, the authentication data is received from the introducer. For example, petitioner 106 may receive the requested username and password from introducer 102.

In block 306, data that specifies a petitioner's cryptographic identity and the petitioner's resource identifier are sent to the introducer. For example, petitioner 102 may send data 118 to introducer 102, as described above with reference to circumscribed numeral 2 of FIG. 1.

In block 308, an authority's resource identifier is received from the introducer. The authority's resource identifier was specified by independent communication between the introducer and the authority. For example, petitioner 106 may receive data 126 from introducer 102 as described above with reference to circumscribed numeral 6 of FIG. 1.

In block 310, the authority's cryptographic identity is received from the introducer. The authority's cryptographic identity was sent, by the introducer, to a destination that is associated with the petitioner's resource identifier described in block 302. The authority's cryptographic identity was sent to the introducer by a device that is associated with the authority's resource identifier described in block 304. For example, petitioner 106 may receive data 126 from introducer 102 as described above with reference to circumscribed numeral 6 of FIG. 1.

In block 312, an association is stored. The association is between the authority's resource identifier, the authority's cryptographic identity, and a user that provided the authentication data to the introducer. For example, petitioner 106 may store an association between user 114 and the public key and URL of authority 110.

As a result of method 300, the cryptographic identity of an authority is obtained with an assurance that the cryptographic identity is what it purports to be, without requiring a user to know or provide the authority's cryptographic identity.

Figure 4:
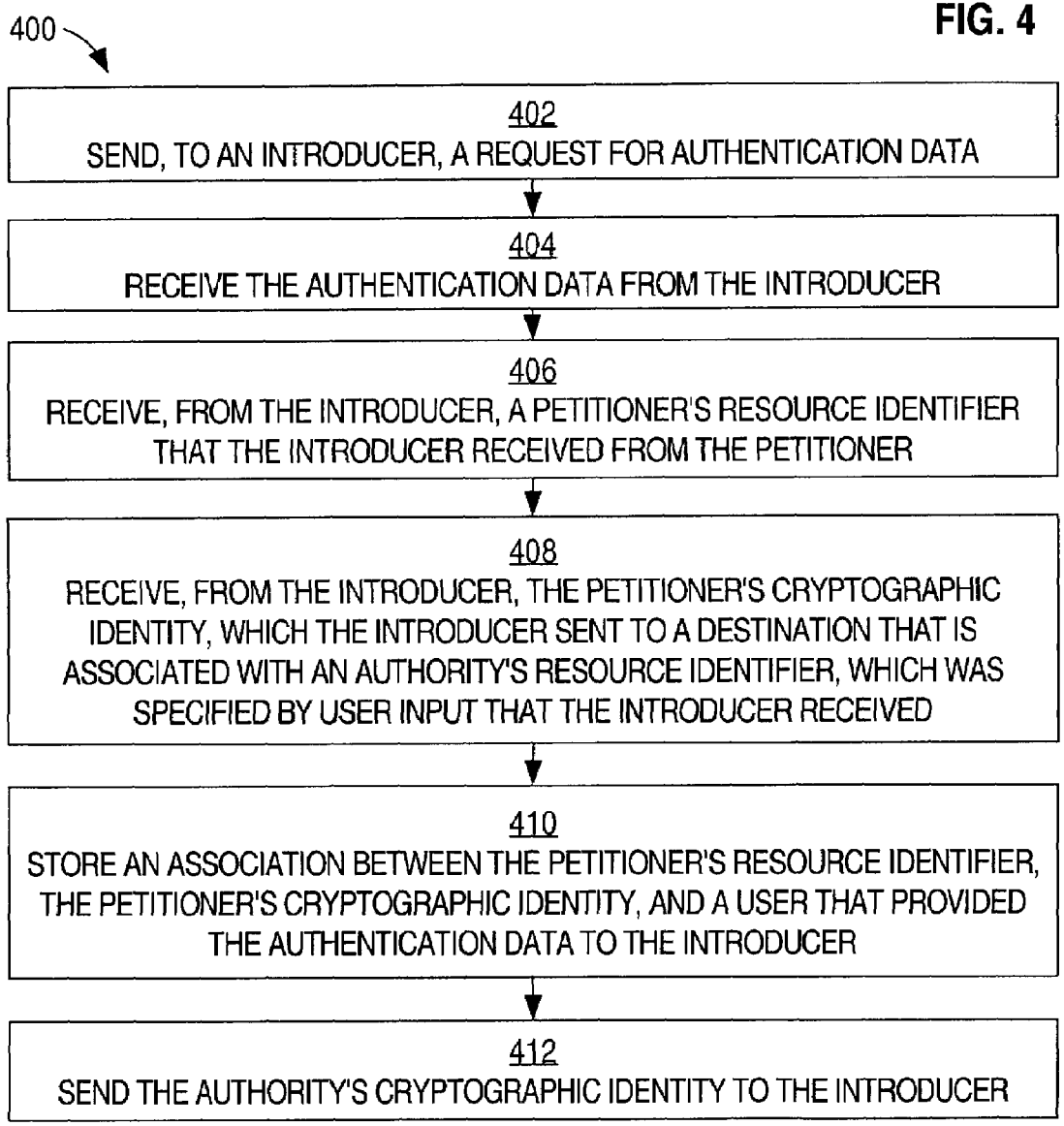
FIG. 4 is a flow diagram that illustrates one embodiment of a method of receiving a petitioner's cryptographic identity, and sending an authority's cryptographic identity, through an introducer.

FIG. 4 is a flow diagram that illustrates one embodiment of a method 400 of receiving a petitioner's cryptographic identity, and sending an authority's cryptographic identity, through an introducer. Such a method may be performed by any of many different devices, such as, for example, authority 108 described above.

In block 402, a request for authentication data is sent to an introducer. For example, authority 110 may send, to introducer 102, a request for a username and password. In block 404, the authentication data is received from the introducer. For example, authority 110 may receive the requested username and password from introducer 102.

In block 406, a petitioner's resource identifier is received from the introducer. The introducer received the petitioner's resource identifier from the petitioner. For example, authority 110 may receive data 122 from introducer 102, as described above with reference to circumscribed numeral 4 of FIG. 1.

In block 404, the petitioner's cryptographic identity is received from the introducer. The introducer sent the cryptographic identity to a destination that is associated with an authority's resource identifier. The authority's resource identifier was specified by user input that the introducer received. For example, authority 110 may receive data 122 from introducer 102, as described above with reference to circumscribed numeral 4 of FIG. 1.

In block 410, an association is stored. The association is between the petitioner's resource identifier, the petitioner's cryptographic identity, and a user that provided the authentication data to the introducer. For example, authority 110 may store an association between user 114 and the public key and URL of petitioner 106.

As a result of method 400, the cryptographic identity of a petitioner is obtained with an assurance that the cryptographic identity is what it purports to be, without requiring a user to know or provide the petitioner's cryptographic identity.

Figure 5:
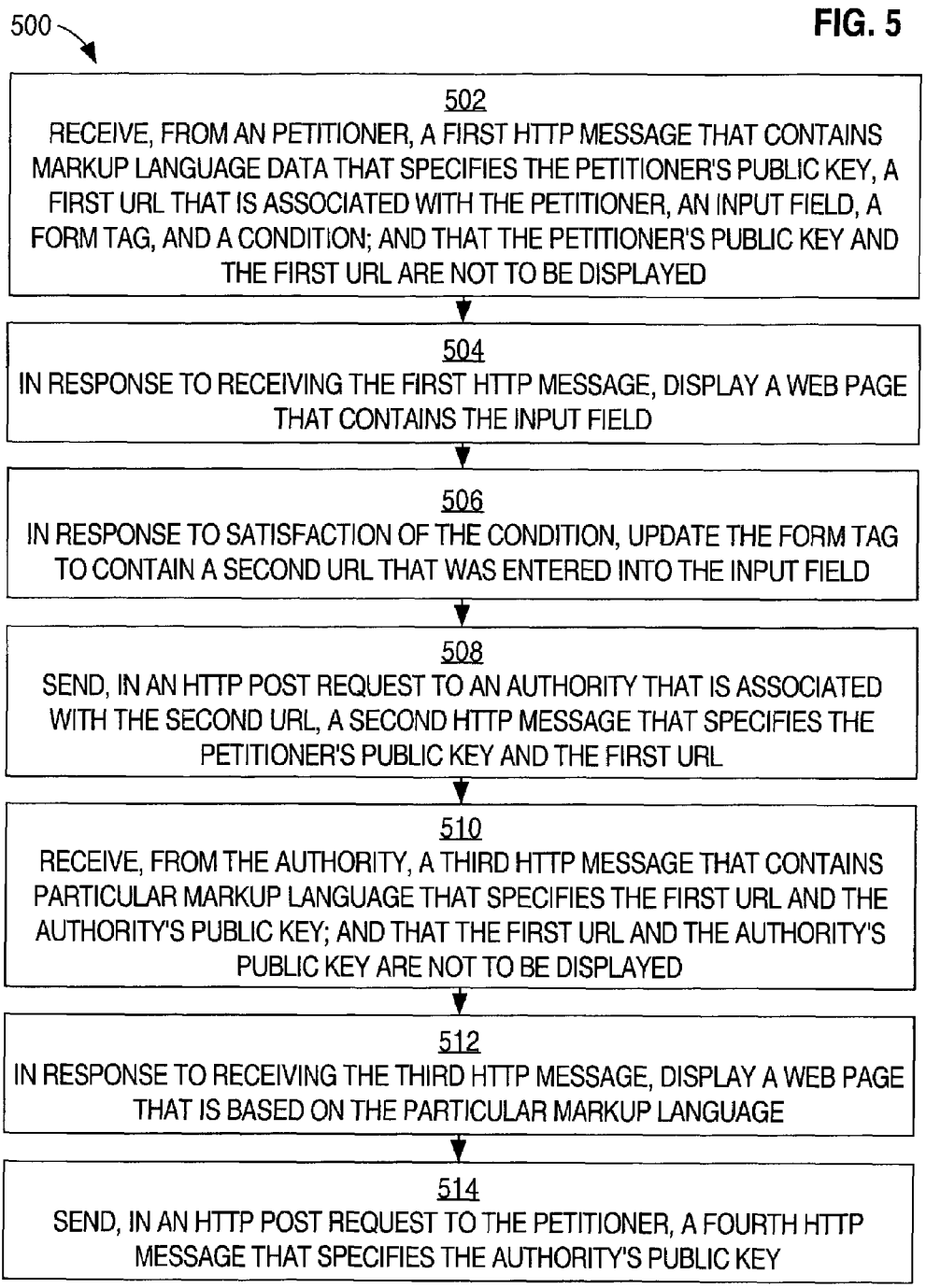
FIG. 5 is a flow diagram that illustrates one embodiment of a method of securely exchanging cryptographic identities by sending Hypertext Transfer Protocol (HTTP) messages through a mutually trusted intermediary.

FIG. 5 is a flow diagram that illustrates one embodiment of a method 500 of securely exchanging cryptographic identities by sending HTTP messages through a mutually trusted intermediary. Such a method may be performed by any of many different devices, such as, for example, introducer 102 described above. HTTP version 1.1 is described in the Internet Engineering Task Force (IETF) Request For Comments (RFC) 2068

In block 502, a first HTTP message is received from a petitioner. The first HTTP message contains markup language. For example, the first HTTP message may contain HTML or Extensible Markup Language (XML).

The markup language specifies a first URL that is associated with the petitioner, an input field, a FORM tag, and a condition. For example, the markup language may specify a URL such as "www.mybank.com/complete.cgi". The markup language may specify a FORM tag such as "<FORM ACTION='default.htm' METHOD='POST'>" and a corresponding "submit" control. The markup language may specify a condition through a scripting language, such as JavaScript. The satisfaction of the condition may be based on whether the "submit" control has been activated or whether some other event has occurred.

The markup language specifies that the petitioner's public key and the first URL are not to be displayed. For example, the petitioner's public key and the first URL may be specified in HTML tags that contain a "hidden" attribute.

In block 504, in response to receiving the first HTTP message, a web page is displayed. The web page contains the input field. In block 506, in response to the satisfaction of the condition, the FORM tag is updated to contain a second URL that was entered into the input field. For example, JavaScript instructions contained in the markup language may specify that, upon the satisfaction of the condition, the FORM tag is to be changed from "<FORM ACTION='default.htm' METHOD='POST'>" to "<FORM ACTION='www.mybookstore.com/intro.cgi' METHOD='POST'>", where "www.mybookstore.com" or "www.mybookstore.com/intro.cgi" is the value of the input field at the time that the condition was satisfied.

In block 508, a second HTTP message is sent in an HTTP POST request to an authority that is associated with the second URL. The second HTTP message specifies the petitioner's public key and the first URL. Continuing the example, the petitioner's public key and the URL "www.mybank.com/complete.cgi" may be sent in an HTTP post request to the URL "www.mybookstore.com/intro.cgi" in response to the activation of a "submit" control or some other event.

In block 510, a third HTTP message is received from the authority. The third HTTP message contains particular markup language that specifies the first URL and the authority's public key. For example, the particular markup language may contain a FORM tag such as "<FORM ACTION="www.mybank.com/complete.cgi" METHOD='POST'>" where "www.mybank.com/complete.cgi" is the first URL that was received from the petitioner in block 502.

The particular markup language specifies that the authority's public key and the first URL are not to be displayed. For example, the authority's public key may be specified in an HTML tag that contains a "hidden" attribute.

In block 512, in response to receiving the third HTTP message, a web page is displayed. The web page is based on the particular markup language. The web page may display a "submit" control that, when activated, causes the contents of a form, including the authority's public key, to be submitted to the first URL.

In block 514, a fourth HTTP message is sent in an HTTP POST request to the petitioner. The fourth HTTP message specifies the authority's public key. When the exchange is completed, the petitioner has the authority's cryptographic identity, and the authority has the petitioner's cryptographic identity. Thereafter, the petitioner and the authority may exchange information related to a user directly and securely. Due to the automatic nature of the introduction between the petitioner and the authority, the user does not need to know or supply the public keys of the petitioner or the authority, making the introduction easy for the user to achieve.

4.0 IMPLEMENTATION MECHANISMS

Hardware Overview

Figure 6:
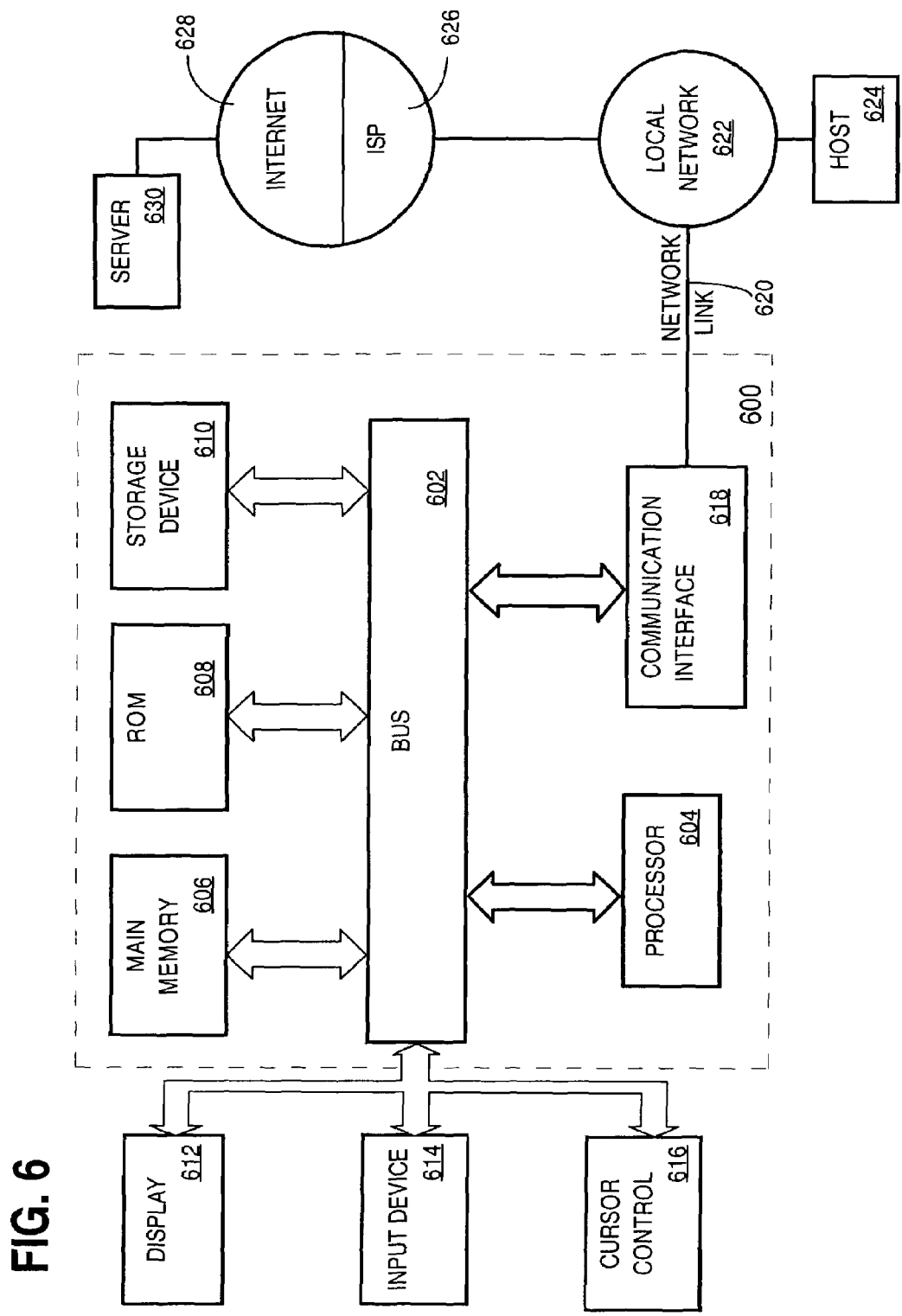
FIG. 6 is a block diagram that illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, trackball, stylus, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for securely exchanging cryptographic identities through a mutually trusted intermediary. According to one embodiment of the invention, securely exchanging cryptographic identities through a mutually trusted intermediary is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for securely exchanging cryptographic identities through a mutually trusted intermediary as described herein.

The received code may be executed by processor 604 as it is received, and/or stored in storage device 610, or other non-volatile storage for later execution. In this manner, computer system 600 may obtain application code in the form of a carrier wave.

5.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

According to one embodiment, data is exchanged between introducer 102 and petitioner 106, and between introducer 102 and authority 110, through communications other than HTTP messages. For example, such communications may take the form of faxed or e-mailed information, or information that has been mailed through a traditional postal service. According to one embodiment, one or more of such communications are performed through offline mechanisms, and not in real-time. For example, there may be an indefinite delay between communications.

While, in one embodiment, petitioner 106 and/or authority 110 requests and receives authentication information, such as a username and password, from introducer 102, in an alternative embodiment, one or both of the petitioner and the authority do not need to request or receive such authentication information from introducer 102. For example, if petitioner 106 or authority 110 is located physically at the same site as introducer 102 and is directly connected to the introducer, then the inherent security of the connection between the two devices may obviate the utility of authenticating the introducer. In one embodiment, one or more of the cryptographic identities are exchanged during a provisioning or enrollment process. Cisco System's Enrollment Express may perform such an enrollment process.

What is claimed is:

1. A computer-implemented method for securely exchanging cryptographic identities through a mutually trusted intermediary, the method comprising:
   receiving, at the trusted intermediary, from a petitioner, data that specifies:
      a first cryptographic identity of the petitioner,
      a first resource identifier identifying a first location where the petitioner is located, and
      an input means for accepting input, from a particular entity at the trusted intermediary, that specifies a second resource identifier identifying a second location where an authority is located;
   receiving, at the trusted intermediary, from the particular entity, the input that specifies the second resource identifier identifying the second location where the authority is located, and to which the trusted intermediary is to send the data received from the petitioner;
   sending, from the trusted intermediary, the first cryptographic identity and the first resource identifier to the authority at the second location indicated by the second resource identifier;
   receiving, from the authority, data that specifies a second cryptographic identity of the authority and the first resource identifier and the second resource identifier; and
   sending, from the trusted intermediary, the second cryptographic identity and the second resource identifier to the petitioner at the first location indicated by the first resource identifier.

2. The method of claim 1, further comprising the computer-implemented steps of:
   requesting first authentication data from a user at the trusted intermediary;
   sending, from the trusted intermediary, the first authentication data to the petitioner at the first location indicated by the first resource identifier;
   requesting second authentication data from the user at the trusted intermediary;

sending, from the trusted intermediary, the second authentication data to the authority at the second location identified by the second resource identifier.

3. The method as recited in claim 1, wherein the data is first web page data, wherein the first resource identifier is a first uniform resource locator (URL) identifying the petitioner, wherein the second resource identifier is a second URL identifying the authority, and wherein the second URL is received from an input field on a web page.

4. The method as recited in claim 1, wherein the data is markup language data contained in a first Hypertext Transfer Protocol (HTTP) message received from the petitioner, wherein the first cryptographic identity is a first public key of the petitioner, wherein the first resource identifier is a first uniform resource locator (URL) identifying the petitioner, wherein the second resource identifier is a second URL identifying the authority, and wherein the second URL is received from an input field on a web page.

5. A computer-implemented method for securely exchanging cryptographic identities through a mutually trusted intermediary, the method comprising:
sending, from a petitioner to a first device that is the mutually trusted intermediary, data that specifies:
a first cryptographic identity,
a first resource identifier identifying a first location where the petitioner is located, and
an input means for accepting input, from a particular entity at the first device, that specifies a second resource identifier identifying a second location where an authority is located;
and
receiving, at the petitioner, from the first device, a second cryptographic identity of the authority and the second resource identifier identifying the second location where the authority is located;
wherein the second cryptographic identity was sent to the first device from a second device that is associated with the second location indicated by the second resource identifier that was specified by the particular entity at the first device; and
wherein the first cryptographic identity was received by the second device before the second cryptographic identify was sent to the first device from the second device.

6. The method of claim 5, further comprising the computer-implemented step of:
sending, from the petitioner, a request for authentication data to the first device.

7. The method of claim 5, further comprising the computer-implemented step of:
storing, at the petitioner, an association between the second cryptographic identity, the second resource identifier, and a user of the first device.

8. A computer-implemented method for securely exchanging cryptographic identities through a mutually trusted intermediary, the method comprising:
receiving, at an authority, from a first device that is the mutually trusted intermediary, a first cryptographic identity and a first resource identifier that the first device received from a second device that differs from the first device and that is located at a first location indicated by the first resource identifier;
wherein the second device sends to, the first device, data that specifies an input means for accepting input, from a particular entity at the first device, that specifies a location for the first device to send the first cryptographic identity and the first resource identifier received from the second device;
wherein the first cryptographic identity was sent to the authority that is located at a second location indicated by a second resource identifier that was specified by the input at the first device; and
sending, from the authority to the first device, data that specifies a second cryptographic identity that differs from the first cryptographic identity;
wherein the second cryptographic identity is to be forwarded to the second device by the first device.

9. The method of claim 8, further comprising the computer-implemented step of:
sending, from the authority, a request for authentication data to the first device.

10. The method of claim 8, further comprising the computer-implemented step of:
storing, at the authority, an association between the first cryptographic identity, the first resource identifier, and a user of the first device.

11. A volatile or non-volatile computer-readable medium carrying one or more sequences of instructions for securely exchanging cryptographic identities through a mutually trusted intermediary, which instructions, when executed by one or more processors, cause the one or more processors to carry out the steps of:
receiving, at the trusted intermediary, from a petitioner, data that specifies:
a first cryptographic identity of the petitioner,
a first resource identifier identifying a first location where the petitioner is located, and
an input means for accepting input, from a particular entity at the trusted intermediary, that specifies a second resource identifier identifying a second location where an authority is located;
receiving, at the trusted intermediary, from the particular entity, the input that specifies the second resource identifier identifying the second location where the authority is located, and to which the trusted intermediary is to send the data received from the petitioner;
sending, from the trusted intermediary, the first cryptographic identity and the first resource identifier to the authority at the second location indicated by the second resource identifier;
receiving, from the authority, data that specifies a second cryptographic identity of the authority and the first resource identifier and the second resource identifier; and
sending, from the trusted intermediary, the second cryptographic identity and the second resource identifier to the petitioner at the first location indicated by the first resource identifier.

12. An apparatus for securely exchanging cryptographic identities through a mutually trusted intermediary, comprising:
means for receiving, at the trusted intermediary, from a petitioner, data that specifies:
a first cryptographic identity of the petitioner,
a first resource identifier identifying a first location where the petitioner is located, and
an input means for accepting input, from a particular entity at the trusted intermediary, that specifies a second resource identifier identifying a second location where an authority is located;
means for receiving, at the trusted intermediary, from the particular entity, the input that specifies the second resource identifier identifying the second location where the authority is located, and to which the trusted intermediary is to send the data received from the petitioner;

means for sending, from the trusted intermediary, the first cryptographic identity and the first resource identifier to the authority at the second location indicated by the second resource identifier;

means for receiving, from the authority, data that specifies a second cryptographic identity of the authority and the first resource identifier and the second resource identifier; and means for sending, from the trusted intermediary, the second cryptographic identity and the second resource identifier to the petitioner at the first location indicated by the first resource identifier.

13. An apparatus for securely exchanging cryptographic identities through a mutually trusted intermediary, comprising:

a network interface that is coupled to a data network for receiving one or more packet flows therefrom;

a processor; and one or more stored sequences of instructions which, when executed by the processor, cause the processor to carry out the steps of:

receiving, at the trusted intermediary, from a petitioner, data that specifies:

a first cryptographic identity of the petitioner, a first resource identifier identifying a first location where the petitioner is located, and an input means for accepting input, from a particular entity at the trusted intermediary, that specifies a second resource identifier identifying a second location where an authority is located;

receiving, at the trusted intermediary, from the particular entity, the input that specifies the second resource identifier identifying the second location where the authority is located, and to which the trusted intermediary is to send the data received from the petitioner;

sending, from the trusted intermediary, the first cryptographic identity and the first resource identifier to the authority at the second location indicated by the second resource identifier;

receiving, from the authority, data that specifies a second cryptographic identity of the authority and the first resource identifier and the second resource identifier; and sending, from the trusted intermediary, the second cryptographic identity and the second resource identifier to the petitioner at the first location indicated by the first resource identifier.

14. The apparatus of claim 12, further comprising:

means for requesting first authentication data from a user at the trusted intermediary;

means for sending, from the trusted intermediary, the first authentication data to the petitioner at the first location indicated by the first resource identifier;

means for requesting second authentication data from the user at the trusted intermediary;

means for sending, from the trusted intermediary, the second authentication data to the authority at the second location indicated by the second resource identifier.

15. The apparatus of claim 12, wherein the data is first web page data, wherein the first resource identifier is a first uniform resource locator (URL) identifying the petitioner, wherein the second resource identifier is a second URL identifying the authority, and wherein the second URL is received from an input field on a web page.

16. The apparatus of claim 12, wherein the data is markup language data contained in a first Hypertext Transfer Protocol (HTTP) message received from the petitioner, wherein the first cryptographic identity is a first public key of the petitioner, wherein the first resource identifier is a first uniform resource locator (URL) identifying the petitioner, wherein the second resource identifier is a second URL identifying the authority, and wherein the second URL is received from an input field on a web page.

17. The apparatus of claim 13, wherein the one or more stored sequences of instructions further comprising:

instructions for requesting first authentication data from a user at the trusted intermediary;

instructions for sending, from the trusted intermediary, the first authentication data to the petitioner at the first location indicated by the first resource identifier;

instructions for requesting second authentication data from the user at the trusted intermediary;

instructions for sending, from the trusted intermediary, the second authentication data to the authority at the second location indicated by the second resource identifier.

18. The apparatus of claim 13, wherein the data is first web page data, wherein the first resource identifier is a first uniform resource locator (URL) identifying the petitioner, wherein the second resource identifier is a second URL identifying the authority, and wherein the second URL is received from an input field on a web page.

19. The apparatus of claim 13, wherein the data is markup language data contained in a first Hypertext Transfer Protocol (HTTP) message received from the petitioner, wherein the first cryptographic identity is a first public key of the petitioner, wherein the first resource identifier is a first uniform resource locator (URL) identifying the petitioner, wherein the second resource identifier is a second URL identifying the authority, and wherein the second URL is received from an input field on a web page.

* * * * *